United States Patent
Reilly et al.

(10) Patent No.: US 9,117,203 B2
(45) Date of Patent: Aug. 25, 2015

(54) METHOD AND APPARATUS FOR AUGMENTED SOCIAL NETWORKING MESSAGING

(75) Inventors: James Francis Reilly, Helsinki (FI); Toni Peter Strandell, Helsinki (FI); Jyri P. Salomaa, Beijing (CN); Jan Otto Blom, Espoo (FI); Ari Antero Aarnio, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1130 days.

(21) Appl. No.: 12/552,095

(22) Filed: Sep. 1, 2009

(65) Prior Publication Data

US 2011/0055335 A1 Mar. 3, 2011

(51) Int. Cl.
G06F 15/16 (2006.01)
G06Q 10/10 (2012.01)
H04L 12/58 (2006.01)
G06Q 50/00 (2012.01)

(52) U.S. Cl.
CPC .............. *G06Q 10/107* (2013.01); *G06Q 50/01* (2013.01); *H04L 12/588* (2013.01); *H04L 51/32* (2013.01)

(58) Field of Classification Search
CPC ................................ G06Q 50/01; H04L 51/32
USPC ......................................... 709/204–206, 224
See application file for complete search history.

(56) References Cited

U.S. PATENT DOCUMENTS

| | | | |
|---|---|---|---|
| 6,016,478 A | 1/2000 | Zhang et al. | |
| 7,389,324 B2 | 6/2008 | Masonis et al. | |
| 2002/0087878 A1* | 7/2002 | Ballen et al. | 713/201 |
| 2005/0120084 A1 | 6/2005 | Hu et al. | |
| 2005/0228876 A1 | 10/2005 | Malik | |
| 2006/0253324 A1* | 11/2006 | Miller | 705/14 |
| 2007/0162458 A1 | 7/2007 | Fasciano | |
| 2008/0045236 A1* | 2/2008 | Nahon et al. | 455/456.1 |
| 2008/0182563 A1 | 7/2008 | Wugofski et al. | |
| 2008/0222308 A1 | 9/2008 | Abhyanker | |
| 2008/0250332 A1* | 10/2008 | Farrell et al. | 715/753 |
| 2008/0307320 A1 | 12/2008 | Payne et al. | |
| 2009/0030927 A1* | 1/2009 | Cases et al. | 707/102 |
| 2009/0037531 A1* | 2/2009 | Boyd | 709/204 |

(Continued)

FOREIGN PATENT DOCUMENTS

EP 1 122 672 A2 8/2001
WO WO 2005/053323 A2 6/2005

OTHER PUBLICATIONS

26 Tricks to Help Ypu Tame Google Calendar, Dunn, Scott, PCWorld, May 19, 2008, http://entrepreneur.com/tgechnologhy/pcworld/article194660.html, pp. 1-3.

(Continued)

*Primary Examiner* — Phuoc Nguyen

(74) *Attorney, Agent, or Firm* — Ditthavong & Steiner, P.C.

(57) ABSTRACT

An approach is provided for augmented social networking messaging. A message is generated for posting to a social networking service. Address information is determined for a group of one or more devices associated with one or more users. At least one of the one or more users is a non-subscriber to the social networking service. The addressing information is used to send the message to the group. A reply to the message is received from one of the devices of the group. Posting of the reply to the social networking service is initiated.

20 Claims, 11 Drawing Sheets

(56) References Cited

U.S. PATENT DOCUMENTS

| | | | |
|---|---|---|---|
| 2009/0112991 | A1 | 4/2009 | Gandhi et al. |
| 2009/0125230 | A1 | 5/2009 | Sullivan |
| 2009/0192871 | A1 | 7/2009 | Deacon et al. |
| 2009/0221280 | A1 | 9/2009 | Mitelberg |
| 2009/0234876 | A1 | 9/2009 | Schigel et al. |
| 2009/0249244 | A1* | 10/2009 | Robinson et al. ............. 715/781 |
| 2009/0292814 | A1* | 11/2009 | Ting et al. ..................... 709/229 |
| 2009/0307607 | A1* | 12/2009 | Schauls et al. ................ 715/752 |
| 2009/0327437 | A1* | 12/2009 | Estrada .......................... 709/206 |
| 2010/0223341 | A1* | 9/2010 | Manolescu et al. ........... 709/206 |
| 2010/0263005 | A1* | 10/2010 | White ............................ 725/109 |
| 2010/0268830 | A1* | 10/2010 | McKee et al. ................. 709/228 |

OTHER PUBLICATIONS

International search report and written opinion for corresponding international application No. PCT/FI2010/050486 dated Dec. 21 2010, pp. 1-20.

Re: Why can you only add 10 address from your current list per day? Ridiculous. Livsey, Michael, yahoo.com. May 10, 2008, http://messages.groups.yahooo.com/Groups/Moderators/threadview?m=te&bn=grp-groupmanagement&tof=2&rt=2&frt=2&dir=f&ri=12437&t=c, pp. 1-7.

Web 2.0 Marketing, Sample Chapters, accessed Feb. 7, 2011, http://ptgmedia.pearsoncmg.com/imprint_downloads/informit/promotions/crossImprintMktg/Marketing2dot0_final.pdf, pp. 1-236.

What types of actvitity are logged under Message Posts, yahoo.com, Aug. 2, 2007, http://help.yahoo.com/l/us/yahoo/groups/original/ownmod/logs/logs-03.html, pp. 1-2.

Communication; Supplementary European Search Report for related European Patent Application No. 10813385.1-1958, dated Jul. 24, 2013, 7 pages.

Office Action for corresponding Chinese Application No. 2010800459796.0, dated Jul. 18, 2014, 7 pages. (English Language Summary included).

Communication pursuant to Article 94(3) EPC for corresponding European Application No. 10 813 385.1, dated Aug. 13, 2014, 6 pages.

Office Action for corresponding Korean Application No. 2012-7008263, dated Oct. 13, 2014, 6 pages. (English Language Summary included).

Office Action for corresponding Korean Application No. 2012-7008263, dated Aug. 7, 2014, 4 pages. (English Language Summary included).

Korean Notice of Preliminary Rejection with English language summary for corresponding Korean Patent Application No. 2012-7008263, mailed Jan. 29, 2014, 6 pages.

\* cited by examiner

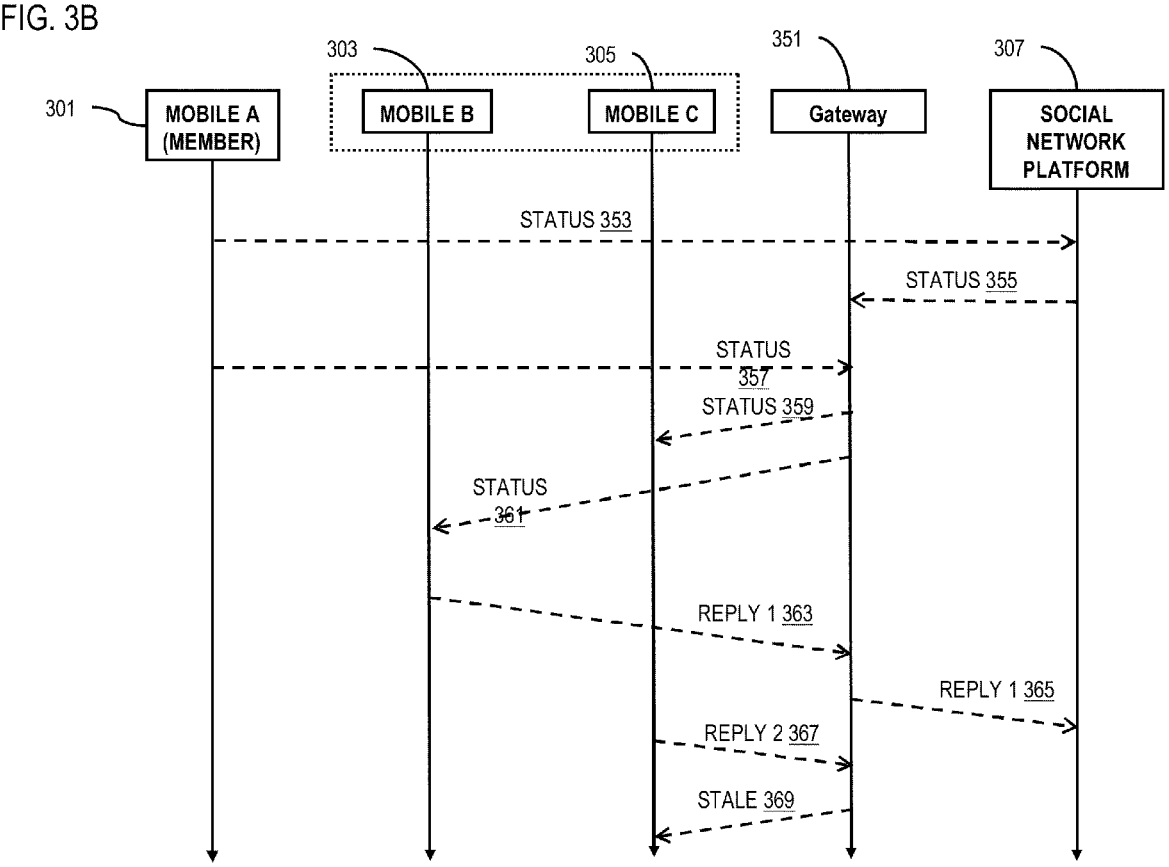

580

12:00 p　　　　　　　Strong | 45%

LESLIE'S PAGE

LESLIE IS HUNGRY!!! ——— 581

JOEY: WANT TO GET PIZZA? ——— 583

KATIE: OOH, THAT'S A GOOD IDEA!!

FROM: PORTLAND

CURRENTLY: AT COLLEGE

LIKES: SLEEPING AND EATING

METHOD AND APPARATUS FOR AUGMENTED SOCIAL NETWORKING MESSAGING

BACKGROUND

Wireless (e.g., cellular) service providers and device manufacturers are continually challenged to deliver value and convenience to consumers by, for example, providing compelling network services. These network services can include social networking services, which provide the ability to keep subscribers abreast of the actions of a member of the social networking service.

SOME EXAMPLE EMBODIMENTS

According to one embodiment, a method comprises generating a message for posting to a social networking service. The method also comprises determining addressing information for a group of one or more devices associated with one or more users. At least one of the one or more users is a non-subscriber to the social networking service. The addressing information is used to send the message to the group. The method further comprises receiving a reply to the message from one of the devices of the group. The method additionally comprises initiating posting of the reply to the social networking service.

According to another embodiment, an apparatus comprising at least one processor, and at least one memory including computer program code, the at least one memory and the computer program code configured to, with the at least one processor, cause the apparatus to generate a message for posting to a social networking service. The apparatus is also caused to determine addressing information for a group of one or more devices associated with one or more users. At least one of the one or more users is a non-subscriber to the social networking service. The addressing information is used to send the message to the group. The apparatus is further caused to receiving a reply to the message from one of the devices of the group. The apparatus is additionally caused to initiate posting of the reply to the social networking service.

According to another embodiment, a computer-readable storage medium carrying one or more sequences of one or more instructions which, when executed by one or more processors, cause an apparatus to generate a message for posting to a social networking service. The apparatus is also caused to determine addressing information for a group of one or more devices associated with one or more users. At least one of the one or more users is a non-subscriber to the social networking service. The addressing information is used to send the message to the group. The apparatus is further caused to receiving a reply to the message from one of the devices of the group. The apparatus is additionally caused to initiate posting of the reply to the social networking service.

According to another embodiment, an apparatus comprises means for generating a message for posting to a social networking service. The apparatus also comprises means for determining addressing information for a group of one or more devices associated with one or more users, wherein at least one of the one or more users is a non-subscriber to the social networking service, and wherein the addressing information is used to send the message to the group. The apparatus further comprises means for receiving a reply to the message from one of the devices of the group. The apparatus additionally comprises means for initiating posting of the reply to the social networking service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B are ladder diagrams of processes for providing augmented social networking messaging, according to one embodiment.

DESCRIPTION OF SOME EMBODIMENTS

A method and apparatus for augmented social networking messaging are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
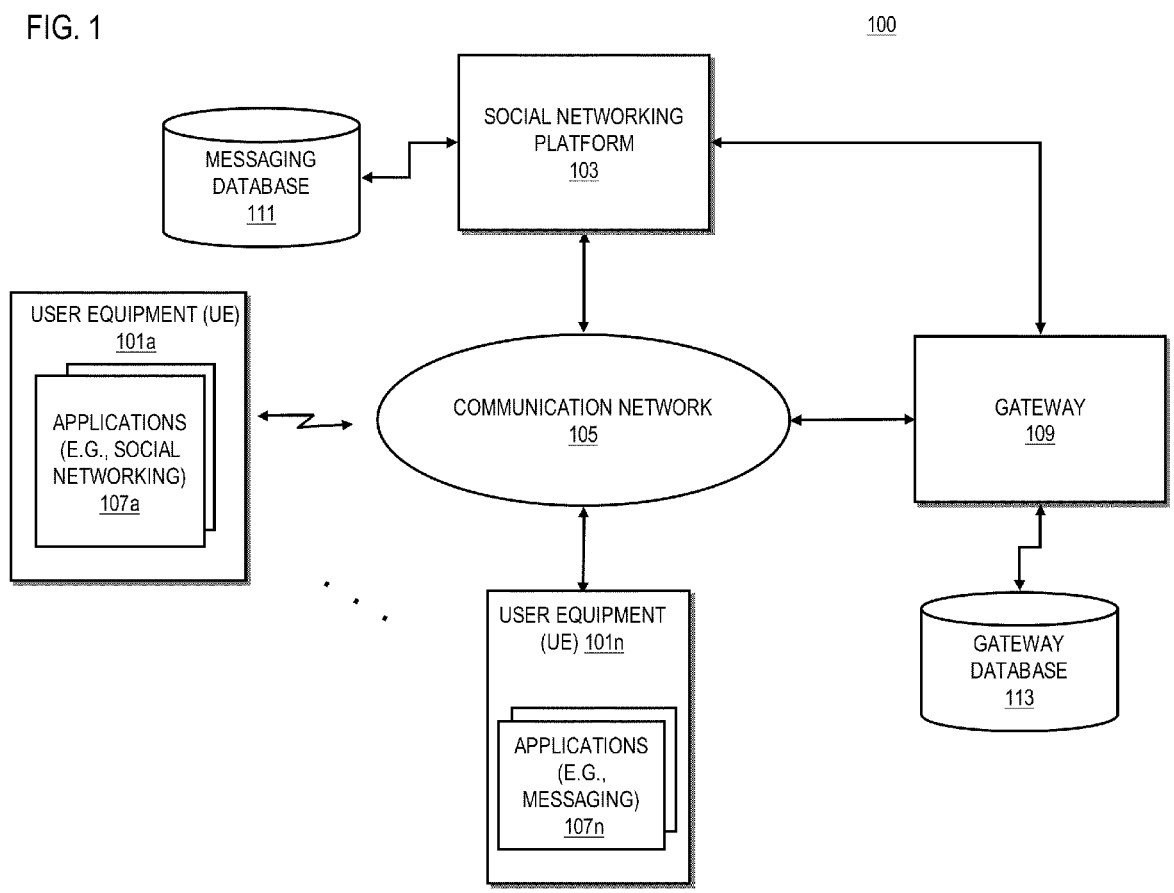
FIG. 1 is a diagram of a system capable of providing augmented social networking messaging, according to one embodiment.

FIG. 1 is a diagram of a system 100 capable of providing augmented social networking messaging, according to one embodiment. To use the current generation of micro-blogging, media sharing, or other social networking services, users are typically required to join the same service. This is inconvenient for people who do not wish to subscribe to the service. Their reluctance to register with a social network service can stem from any number of reasons, such as cost and privacy concerns. Traditionally, these non-subscribers cannot be involved with communication exchanges resulting from updates to a social networking service. For example, a user of a social networking service may want to post status messages and/or instant messages to all of the user's friends in the service, and also to all friends who are not members of the social networking service.

To address this problem, a system 100 of FIG. 1 introduces the capability to provide subscription-less social networking via the use of messaging services on a mobile device. The system 100 allows for the updating, according to one embodiment, of status messages and responses, e.g., in form of micro blogs, using simple messaging services (e.g., short message service (SMS), multimedia messaging service (MMS), other forms of text messaging, etc.) available on a mobile device without being required to subscribe to a social networking service. In one scenario, a user can be a member of a social networking service where the user may post micro blog status messages, which can be commented on by other users. In one embodiment, the user can define a "messaging buddies" list using one or more contacts from a contacts list or phone book to make available the status messages and commenting. When the user posts a new status message from an application on the user's mobile device or other device, the status message is posted to the service and to the list of messaging buddies. The messaging buddies receive text messages corresponding to the message posts. The messaging buddies that receive the status message posts may comment on the status message by replying to the message using certain protocols. The replies can be received by a mobile device of the user and can be posted to the social networking site using an application residing on the mobile device. In this manner, comments to status messages can be interleaved from friends who have accounts in the social networking service and from friends who have no account and simply use messaging services of a mobile device.

Under the scenario of FIG. 1, system 100 involves user equipments (UEs) 101a-101n having connectivity to a social networking platform 103 via a communication network 105. The UE 101 can utilize a social networking application 107a or a messaging application 107n to send and receive micro blog messages. In one embodiment, a UE 101a posts messages associated with the social networking platform 103 via a gateway 109 to a UE 101n. In another embodiment, a UE 101n connects to the social networking platform 109 through the communication network 105 via another UE 101a. In one embodiment, the social networking platform 103 has a messaging database 111 that keeps track of blogging posts and comments on the blogging posts. A gateway database 113 can include information regarding addresses (e.g., phone numbers) to UEs 101. Additionally, the social networking service can update the messaging database 111 with the information of the user's message as well as comments associated with the message posted by other users.

According to one embodiment, the system 100 includes a social networking platform 103. The social networking platform 103 can be associated with one or more social networking service (e.g., FACEBOOK, TWITTER, MYSPACE, LINKEDIN, etc.). In other embodiments, a social networking service may be instantiated on one or more devices (e.g., a peer-to-peer social networking service between UEs 101). A user, via a UE 101a, can post a message (e.g., a status message) to the social networking service platform 103 to allow other people to become aware of the contents of the message. The social networking platform 103 can be accessed by other UEs 101n to retrieve the content of the message. The users of the other UEs 101 subscribe to the social networking service. In one embodiment, an application 107a on the UE 101a of the user is used to distribute the message to both the social network service and to users that are not necessarily subscribed with the social networking service. For example, the application 107 can send a text message to the receiving UE 101n or can post the message to the social networking platform 103. In one embodiment, the social networking platform 103 provides a mechanism to send text messages (or other messages) to UEs 101 associated with a list of the user, but not subscribed to the social networking service.

In one example, one of the messaging buddies responds to one of the text message status message posts. The messaging buddy replies within a certain time window, and the messaging buddy also replies to the phone number associated with the message (e.g., the sender's phone number). Thus, a messaging application 107 can associate the sender with responses (e.g., comments to a status message from messaging buddies) to a time window with respect to the time when the originating message was sent. The time window and the information that the sender of an SMS is a messaging buddy provides confidence that an inbound SMS text message is a response to a status message post that was sent via text message, as opposed to a coincidental text message sent to a sender from a messaging buddy within the same time window that had nothing to do with the original status message that was sent. Thus, the messaging application 107 can select to update the social network platform 307 of the reply message if the reply message meets the time window and sender qualifications.

In another embodiment, the social networking platform 103 can be associated with a gateway 109; the gateway 109 can be used as a conduit to deliver messages to both to the social networking service and to users that may not have a subscription to the social networking service. The gateway 109 can use, for example, a phone number as a channel to deliver messages to messaging buddies of the user. The messaging buddies are set up by the user, or via a plugin to the social networking service. The gateway 109 can have a number of telephone numbers with messaging capabilities associated with it. The telephone numbers could be used as channels sitting between a social networking service user and messaging buddies of the service user.

Under the scenario of FIG. 1, each channel can have a unique telephone number associated with it. When a user posts a new status message and it is sent by text message to the buddies' phones, the text message is sent via the gateway 109 using one of the unique mobile phone numbers associated with gateway 109 or a channel of the gateway 109. Using this approach, if the original status message is also sent via the gateway 109, the receiving telephone numbers can be included in the status message via a plugin. Alternatively or additionally, the gateway phone number is used to send the status message. The gateway 109 may also be provided access to the list of messaging buddies by the sender. With the messaging buddies access, the receiving buddy access need not be provided in the status message. The gateway 109 can then extract the phone numbers and send the status message to each recipient and store in a gateway database 113 a sender phone number, a status message identifier (ID), and a recipient phone number triplet. In one embodiment, because the sender phone number is associated with the recipient phone number triplet in the gateway database 113, if the recipient replies to the message, the gateway 109 can associate the recipient with the sender. Additionally, the gateway 109 can associate the recipient replies with the other recipients of the original message. The replies can thus be sent by the gateway 109 to the sender and other recipients of the status message.

In one example, one of the messaging buddies responds to one of the text message status message posts. According to one embodiment, the messaging buddy replies within a certain time window, and the messaging buddy also replies to the phone number associated with the message and the original sender sent via the gateway 109, which can be used as a unique channel. Thus, a mobile application 107 can now associate the sender with responses (e.g., comments to a status message from messaging buddies) to both a time window and a channel used to send the original status message by utilizing the gateway 109. Time window and channel information implementation provides confidence that an inbound SMS text message is a response to a status message post that was sent via text message, as opposed to a coincidental text message sent to a sender from a messaging buddy within the same time window that had nothing to do with the original status message that was sent. The gateway 109 can send a comment to a "status message" to all recipients of the original message, thereby saving costs for the sender of a "status message" or a comment because the transactions need not be transmitted directly to the UE 101 of the sender.

In one embodiment, to provide UEs 101 with the ability to personalize a user interface, the gateway 109 can also include a status message identifier (ID), e.g., a name, phone number, etc., to the response SMS so that the original sender's UE 101 can show the status message and its comments together in a user interface (e.g., by initiating posting of the messages on a social networking service).

As shown in FIG. 1, the system 100 comprises UEs 101 having connectivity to a social networking platform 103 and gateway 109 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, social networking platform 103, and gateway 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
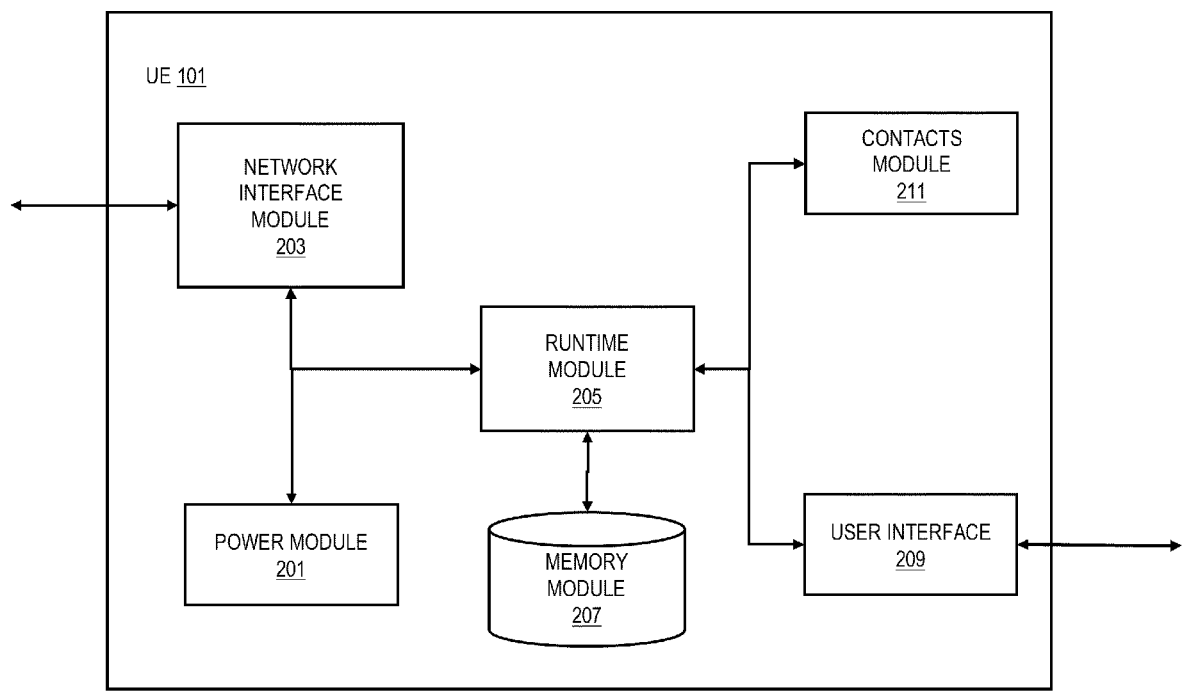
FIG. 2 is a diagram of the components of a user equipment, according to one embodiment.

FIG. 2 is a diagram of the components of a user equipment 101, according to one embodiment. By way of example, the UE 101 includes one or more components for providing augmented social networking messaging. It is contemplated that the functions of these components may be combined in one or more components or performed by other components of equivalent functionality. In this embodiment, the UE 101 includes a power module 201, a network interface module 203, a runtime module 205, a memory module 207, a user interface 209, and a contacts module 211.

The power module 201 provides power to the UE 101. The power module 201 can include any type of power source (e.g., battery, plug-in, etc.). Additionally, the power module 201 can provide power to the components of the UE 101 including processors, memory, and transmitters.

In one embodiment, a UE 101 includes a network interface module 203. The network interface module 203 can be used by the runtime module 205 to communicate with a social networking platform 103. In some embodiments, the social networking platform 103 is used to keep track of the status of a user of the UE 101. In another embodiment, the network interface module 203 is used to communicate with a gateway 109 via the communication network 105. In one embodiment, the network interface module 203 communicates with the social networking platform 103 via the gateway 109 or via another UE 101. In another embodiment, the gateway 109 is used to communicate via a text messaging format with a UE 101.

In one embodiment, a UE 101 includes a user interface 209. The user interface 209 can include various methods of communication. For example, the user interface 209 can have outputs including a visual component (e.g., a screen), an audio component, a physical component (e.g., vibrations), and other methods of communication. User inputs can include a touch-screen interface, a scroll-and-click interface, a button interface, etc. A user can input a request to upload or receive object information via the user interface 209. In one embodiment, the user interface 209 displays a web browser. In this embodiment, the runtime module 205 receives a request from a user input and stores the request in the memory module 207. In another embodiment, the user interface 209 displays text messaging. In yet another embodiment, the runtime module 205 executes an application 107 associated with a social networking service that is displayed on the user interface 209.

In one embodiment, a UE 101 includes a contacts module 211. The contacts module 211 can include phone numbers of people that a user of the UE 101 knows. The contacts module 211 can also be used to set up subgroups of people that can include a messaging buddies list. For example, the multiple messaging buddies lists can be used to send messages to the buddies. Also, the messaging buddies lists can be associated to an application 107 executed by a runtime module 205. The application 107 can be associated with a social networking service. In one embodiment, the application 107 can post a message (e.g., a status message or other micro-blog message) via the social networking service. When the status is posted, application 107 can also send the message to the messaging buddies via a text messaging service.

In one embodiment, a runtime module 205 of the UE 101*a* executes a social networking application 107*a*. A user can post a message to a social networking service using the application 107*a* via a network interface module 203. During the posting event, the application 107*a* can determine that a list of messaging buddies should be sent a text message corresponding to the posted message. The receiver of the text message can then reply to the text message to comment on the message. In one example, when text messages are sent from a UE 101, the text messages are time stamped by the UE 101. When the text messages are sent to a particular number, at a particular time, if a text message response is received from that particular number within a certain time window (e.g., a few minutes), the application 107*a* can assume that a received text message is in response to the original text message. In this example, the receiving UE 101*n* can be implemented using only text messaging capabilities without any need for a subscription to the social networking service or independent applications on the UE 101*n*. The response can be assumed to be a comment to the posted message (e.g., a status message) if the response is from a member of the text messaging buddies within a certain time frame from the original posting. Text messaging buddies can be recognized by an identifier (e.g., a phone number). In one example, the application 107*a* has rights to read the text messaging inbox of the user. Thus, the application 107*a* on the UE 101*a* can retrieve the received text message and relay the message to the social networking service to add as a comment. Under one scenario, the responsive text message initiates a process for relaying the response message to the social networking site for the subscribers in the social networking service. The user of the UE 101*a* can select which text messages to post.

In one embodiment, the runtime module 205 can utilize ports of a UE 101 to uniquely identify a social networking application 107*a*. In this embodiment, the posting UE 101*a* and a buddy UE 101*n* can both have corresponding applications. In one example, the applications 107 on both UEs 101 are compatible. The application 107*n* on the buddy UE 101 can be a simplified, specialized, or limited application 107*n*. In this example, the buddy need not subscribe to any social networking service or give out personal information, the buddy can simply install the application 107*n*. Additionally, the post and the buddy replies may indicate the social networking service associated with the post and/or reply. The indication can be in the form of a message at the start of a text message (e.g., the text message starts with SSA or FB to represent that the posting and/or reply message is associated with social service A or FACEBOOK respectively. In one embodiment, text messaging ports (e.g., a set of SMS ports) can be used to uniquely identify the application 107. Then, the posting and buddy UEs 101 could have a unique channel between them corresponding to the port numbers used. Multiple ports can be used by the applications 107 to segregate messaging data. For example, the posting UE 101*a* can send a post to one set of buddies using one port number and another post to a set of other buddies using another port number. Buddies receiving the post can respond using the assigned port number. Thus, the posting UE 101*a* is able to determine which buddy message is responding to which post. A separate port number can be used for other text messages unassociated with the application 107. For buddies that do not have the application 107 installed, the messages can be received in the user's text messaging inbox and the responses can be forwarded for posting using non-port means described in the previous paragraph.

Under one scenario, the application 107 can be used as a "hook" to the buddy to join the social networking service. In one embodiment, the status message can include a link to the service to encourage the buddy to become a member of the service. The buddy can become more inclined to join the service by becoming more accustomed to the messages and benefits of the service. Additionally, the application 107 may send a personalized link in addition to the status message to facilitate becoming a member of the service. For example, the status message can be sent with a personalized link to all non-member or selected non-member buddies in addition to the status message.

Figure 3A:
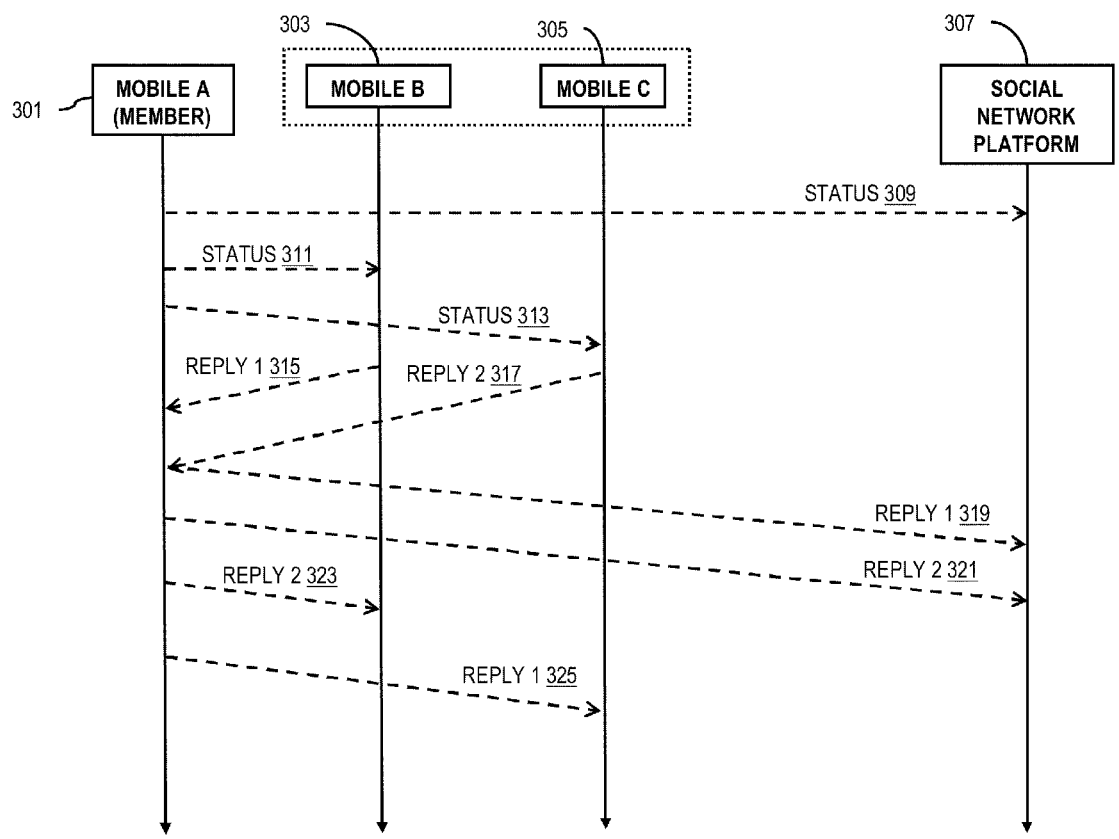

FIGS. 3A and 3B are ladder diagrams of processes for providing augmented social networking messaging, according to one embodiment. A member of a social networking service can, via a mobile device (Mobile A) 301, send a message to a group of mobile devices (e.g., Mobile B 303 and Mobile C 305) by posting the message to a social networking platform 307. Address information (e.g., phone numbers) associated with the group of mobile devices can be saved in a list. In one exemplary embodiment, the message is a status message or an instant message. In one example, the status of the member is updated using an application executed on Mobile A 301. At step 309, the status update is updated on the social network platform 307 using Mobile A 301. At steps 311 and 313, Mobile A 301 also sends a status update to a group of users (e.g., Mobile B 303 and Mobile C 305). The status update can be via an SMS, a text message, MMS, Unstructured Supplementary Service Data (USSD), e-mail, or any other type of mobile messaging. In one embodiment, the user of Mobile B 303 is a member of the social networking service, but is sent the message via the messaging service to expedite the flow of information to the user of Mobile B 303. In another embodiment, the user of Mobile C 305 is not a member of the social networking service. At steps 315 and 317, the user of Mobile B 303 and Mobile C 305 can respond to the message. The reply messages can be received by Mobile A 301.

In one embodiment, at steps 319 and 321, the reply messages are used to update the social network platform 307. Additionally, Mobile A 301, at steps 323 and 325 can send the reply messages to the group of mobile devices. Mobile A 301 can determine if incoming messages are associated with the sent status message. If an incoming message is not associated with the sent status message, Mobile A 301 can determine that the incoming message is not related to the status message and Mobile A 301 need not update the social network platform 307. In this embodiment, Mobile A 301 can take note of what time the sent status message was sent. If the incoming message is within a predetermined time window after the status message was sent, it can be qualified as a possible reply to the send status message. In one example, Mobile A 301 can also retrieve a phone number from an incoming message. Mobile A 301 can then compare the phone number (or another identifier) to the address information to determine if the incoming message is associated with the sent status message. The predetermined time window qualification and address identifier combination can provide a certain level of certainty as to whether the incoming message should be considered reply messages that should be updated on the social network platform 307. If the identifier does not match, the incoming message is not associated with the sent status message. If the identifier does match, the incoming message is qualified as a reply. In another example, if an incoming message meets the temporal and user qualifications, the information in the message is posted. Mobile A 301, Mobile B 303, and Mobile C 305 can execute compatible applications. Mobile B 303 and Mobile C 305 need not have to be members of the same service as Mobile A 301. The applications can use a set of ports. In one embodiment, if incoming messages are not associated with a particular port or set of ports associated with the sent status message, the incoming messages are not qualified as being a reply.

In one embodiment, the user of Mobile C 305 is a member of the same service as Mobile A 301. Responses from the Mobile C 305 can be associated with Mobile C 305 the messaging application 107 of Mobile A 301 because the messaging application 107 can have access to a list of the group and a list of corresponding members of the service. Then, when sending the message reply 321 to the social network platform 307, Mobile A 301 can inform the social network platform 307 that the message is associated with the user of Mobile C 305. Under one scenario, the social network platform 307 can receive the member data of the user of Mobile C 305 in the message reply 321. Then, the social network platform 307 can enable visibility options based on the user preferences of Mobile C 305. For example, members of the social network service can are friends with the user of Mobile C 305 can view the message associated with the user of Mobile C 305.

In another embodiment, Mobile B 303 is not a member of the social network platform 307. Under this scenario, Mobile B 303 sends its reply 315 to Mobile A 301 and Mobile A 301 determines that Mobile B 303 is associated with the status update. The user of Mobile B 303 is not a member of the social network platform 307. Thus, the user of Mobile B 303 has not agreed to the terms of service of the service of social network platform 307. Thus, a determination can be made by Mobile A 301 do determine what restrictions, if any, should be placed on any reply messages received from Mobile B 303. In one example, Mobile A 301 determines that the message should not be sent to the social network platform 307 because the user of Mobile B 303 has not consented to such a posting. In another instance, Mobile A 301 determines that the message should be sent to the social network platform 307, but restrictions should be made so that the message is private to only the account associated with Mobile A 301. In this instance, the user of Mobile A 301 may receive the message, and the users in the group may receive the message, but the message is not posted for viewing by other users of the social network platform 307. Under another scenario Mobile A 301 determines that the message should be posted to the social network platform 307 without any restrictions. Thus, the user of Mobile A 301 can explicitly share the content of the Mobile B 303 message using the social network platform 307. Mobile A 301 can post the message according to the terms of service that the user of Mobile A 301 has agreed to.

In one embodiment, the update of the reply messages can include identifying information of the user of Mobile B 303 and/or Mobile C 305. The replies can be in the form of text messages. In this embodiment, Mobile A 301 retrieves a phone number associated with the reply. Mobile A 301 can then compare the phone number to phone numbers stored in the device's memory to determine an identifier (e.g., a name or a nickname associated with the phone number) associated with the phone number. The identifier can be used to associate the replying user with the reply message.

FIG. 3B is a ladder diagram of a process for providing augmented social networking messaging, according to one embodiment. A member of a social networking service can, via a gateway 351, send a message to a group of mobile devices (e.g., Mobile B 303 and Mobile C 305) by posting the message to a social networking platform 307. In one embodiment, at step 353, Mobile A 301 sends the social network platform 307 the message. The social network platform 307 can then notify the gateway 351 of the message at step 355. In another embodiment, Mobile A 301 directly notifies the gateway 351 of the message at step 357. The gateway 351 can also be provided a list of the group of mobile devices by the social network platform 307 or Mobile A 301. The gateway 351 can store this list in a database associated with the user of Mobile A.

In one embodiment, the gateway 351 utilizes a group of phone numbers as channels to deliver messages to mobile devices. In one embodiment, the phone number used for the channel can be unique to the users in the group. For example, a first publisher using the gateway 351 can have Mobile B 303 as a user in the first publisher's group. A second publisher using the gateway 351 can also have Mobile B 303 as a user in the second publisher's group. When the second publisher sends a request to send a message, the gateway 351 compares the list of users in the message with a list of users currently active on a gateway channel before sending the message via the channel. If Mobile B 303 is currently active on the gateway channel, the gateway 351 will use a different channel to send the message to Mobile B 303 or the entire group. In one embodiment, a device is currently active on a gateway channel if within a predetermined time period, the device was sent a message. In another embodiment, a device becomes active on a channel if a message is sent to the device. The device can be deactivated by the course of time, or by using an ordering algorithm (e.g., round-robin, first in first out, etc.).

At steps 359 and 361, the gateway 351 notifies the group of mobile devices of the status message. The gateway 351 can use an unknown phone number to the user, therefore, an identifying message can be used (e.g., from User of Mobile A 301). In some embodiments, the user of Mobile B 303 and/or Mobile C 305 would like to comment on the status message. At step 363, Mobile B 303 replies to the message by sending a message (e.g., a text message) to the gateway 351 on the channel the message was received. In one embodiment, gateway 351 compares the phone number of Mobile B 303 to the phone number in its active database. The active database determines that the phone number is associated with the user of Mobile A 301. The gateway 351 may then send the reply message to the original sender of the status message, Mobile A 301, and the receivers of the status message, Mobile B 303 and Mobile C 305. At step 365, the gateway 351 updates the social network platform 307 with the reply message. In one example, the gateway 351 can send the reply message to the rest of the associated group. In another example, associated activity timers can be reset when the reply message is sent out. At step 367, Mobile C 305 can respond to the message by responding on the channel the message was received. The gateway 351 can determine that the phone number of Mobile C 305 is not in the active database. At step 369, the gateway 351 can send a response to Mobile C 305 indicating that the response was stale.

In one embodiment, the user of Mobile C 305 is a member of the same service as Mobile A 301. The gateway 351 can determine that the response is associated with the status message. The response 367 from the Mobile C 305 can be associated with Mobile C 305 by the gateway 351 because the gateway 351 can have access to a list of the group and a list of corresponding members of the service (e.g., a buddy list associated with Mobile A 301). Then, when sending a message reply (not shown) to the social network platform 307, the gateway 351 can inform (e.g., by sending identification information) the social network platform 307 that the message is associated with the user of Mobile C 305. Under one scenario, the social network platform 307 can receive the member data of the user of Mobile C 305 in the message reply. Then, the social network platform 307 can enable visibility options based on the user preferences of Mobile C 305. For example, members of the social network platform 307 can are friends with the user of Mobile C 305 can view the message associated with the user of Mobile C 305 or members of the social network platform 307 that are in the same groups as the user of Mobile C 305 on the social network platform 307 can receive access to the message.

In another embodiment, Mobile B 303 is not a member of the social network platform 307. Under this scenario, Mobile B 303 sends its reply 363 to the gateway 351 and the gateway 351 determines that the message from Mobile B 303 is associated with the status update. The gateway 351 also determines that the user of Mobile B 303 is not a member of the social network platform 307. Accordingly, the user of Mobile B 303 has not agreed to the terms of service of the service of social network platform 307. Next, a determination can be made by the gateway 351 to determine what restrictions should be placed on any reply messages received from Mobile B 303. In one example, the gateway 351 determines that the message should not be sent to the social network platform 307 because the user of Mobile B 303 has not consented to such a posting. In another instance, the gateway 351 determines that the message should be sent to the social network platform 307, but restrictions should be made so that the message is private to only the account associated with Mobile A 301. In this instance, the user of Mobile A 301 may receive the message, and the users in the group may receive the message, but the message is not posted for viewing by other users of the social network platform 307. Under another scenario, the gateway 351 determines that the message should be posted to the social network platform 307 without any restrictions. Thus, the user of Mobile A 301 can share the content of the message of Mobile B 303 via the social network platform 307. The gateway 351 can post the message for Mobile A 301 according to the terms of service that the user of Mobile A 301 has agreed to.

With the above approach, users of devices can receive and comment on messages (e.g., status messages) from a member of a social networking service. In this manner the users of the devices need not be subscribed to the social networking service to receive and comment upon the messages. Thus, the micro-blogging on a social networking service can be expanded to users of UEs 101 via text, SMS, MMS, or other sorts of messaging. Additionally, this allows for users of devices that carry the capability to use text messaging, but no additional data services, to stay informed of the status of buddies.

Figure 4:
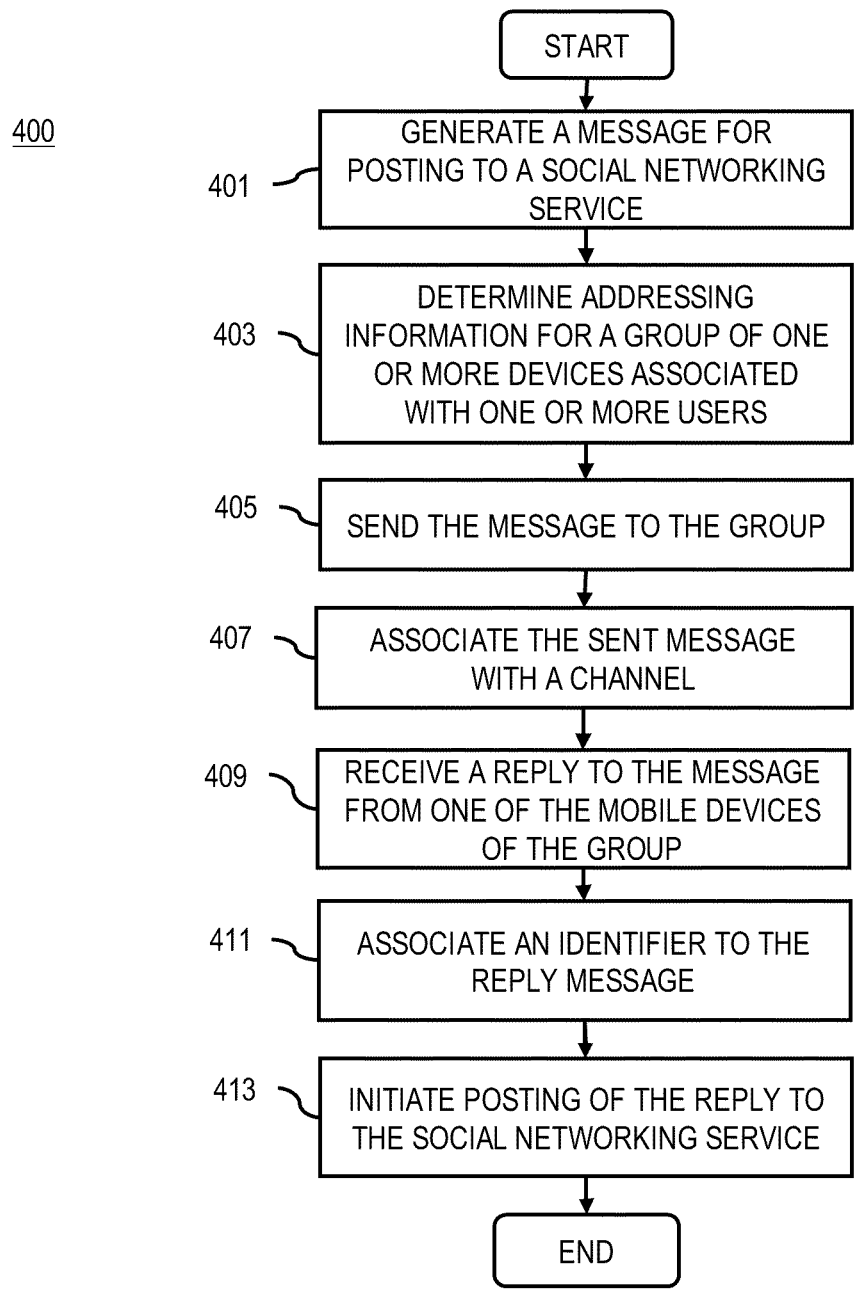
FIG. 4 is a flowchart of a process for providing augmented social networking messaging, according to one embodiment.
Figure 5A:
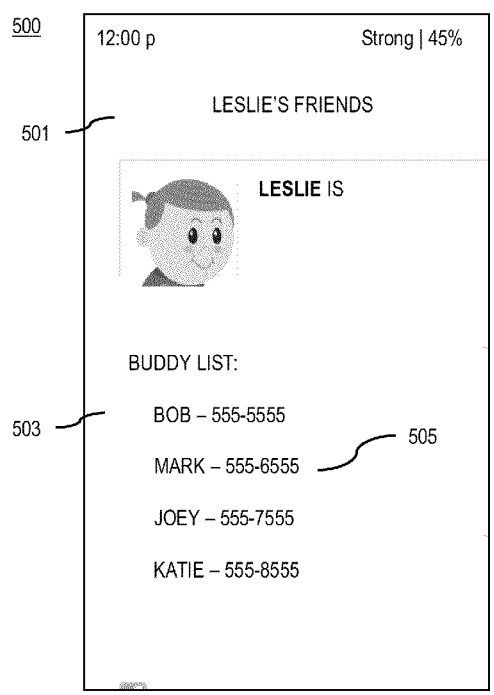
FIGS. 5A-5E are diagrams of user interfaces utilized in the processes of FIGS. 3 and 4, according to various embodiments.
Figure 5B:
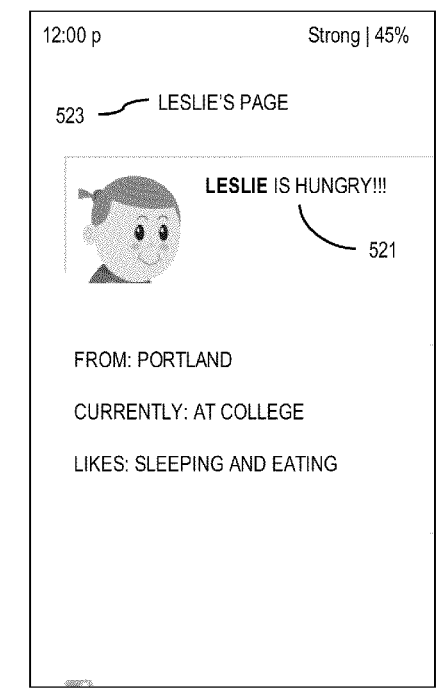
Figure 5C:
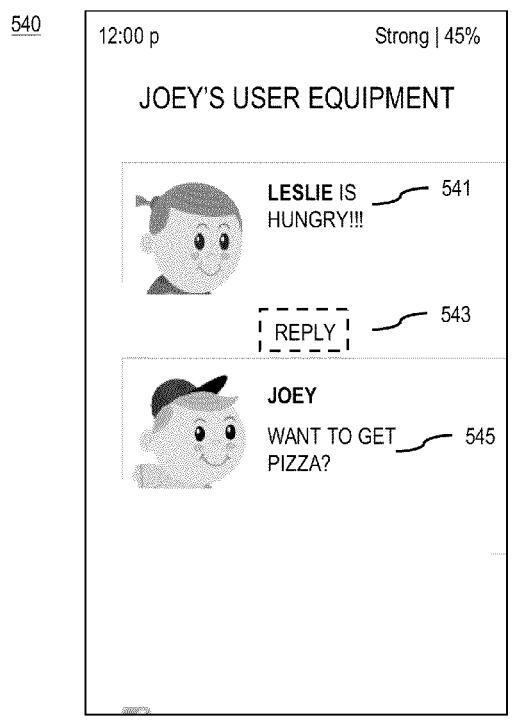
Figure 5D:
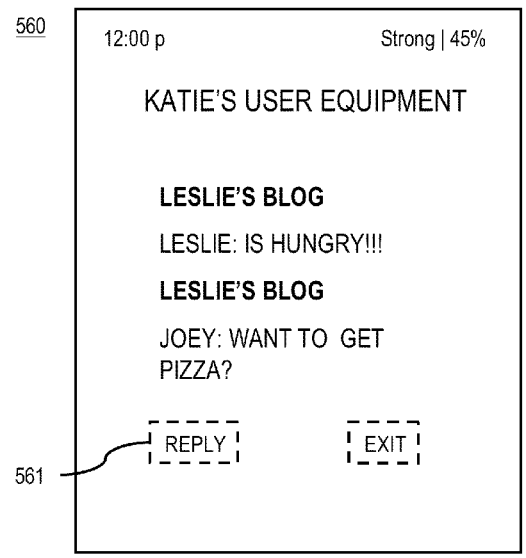
Figure 5E:
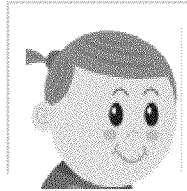

FIG. 4 is a flowchart of a process for providing augmented social networking messaging, according to one embodiment. In one embodiment, the gateway 109 or UE 101 performs the process 400 and is implemented in, for instance, a chip set including a processor and a memory as shown FIG. 7. In step 401, a message is generated by a member of a social networking for posting to a social networking service. In one embodiment, the message is generated on a UE 101. In another embodiment, the message is generated by a gateway 109 based on information from a UE 101 or some other source.

At step 403, addressing information for a group of one or more devices associated with one or more users is determined. In one embodiment, a UE 101 or gateway 109 stores addressing information for the group in a database. The UE 101 can be used to create or update the addressing information. In another embodiment, the UE 101 or gateway 109 can access the information from a social networking platform 103. In one embodiment, at least one of the one or more users is a non-subscriber to the social networking service. The addressing information can be in the form of a telephone number, for instance.

At step 405, the addressing information is used to send the message to the group. In one embodiment, the message is in the form of a text message. In one embodiment, the UE 101 associates the message with a port. The port can be utilized to send and receive messages to the group of one or more mobile devices. In another embodiment, at step 407, the gateway 109 associates the message with a channel (e.g., a telephone number) and the channel is used to communicate with the group of one or more mobile devices. The gateway 109 can associate the channel with the message and the group of one or more mobile devices by using a list of phone numbers. Under one scenario, the UE 101 of the member is a primary phone number associated with the channel. The phone numbers of the group of one or more mobile devices can also be stored as associated with the member's phone number. More than one UE 101 can be a primary phone number on a single channel at a certain time. Additionally, a UE 101 can be the primary phone number on multiple channels at the same time.

At step 409, the UE 101 or gateway 109 receives a reply to the message from one of the mobile devices of the group. In one embodiment, the UE 101 waits for a threshold time period for replies to the message. When a message is received, the UE 101 can determine that the message is received within the threshold time period. If a reply (e.g., a message from a phone number associated with one of the addresses of the group) is received within the threshold period, it is likely that the message is meant to be a reply that should be posted to the social networking service. In another embodiment, the UE 101 monitors a port (or a set of ports) associated with text messaging for incoming messages on the port. If a reply message is within the threshold period and on the port, there is a high likelihood that the message is meant to be a reply that should be posted. The users of the group can have an application installed on the users' UEs 101 that can be used to send messages via the port.

In another embodiment, the gateway 109 or UE 101 of the member receives the reply message on a channel. At step 411, the gateway 109 associates an identifier to the reply message. In one example, the identifier is the phone number of the replying UE 101. The gateway 109 then compares the identifying information to a database that contains the list of addresses of the group. The identifier is then associated with the user phone number. Thus, the reply message is associated with the replying user.

At step 413, posting of the reply to the social networking service is initiated. Because the replying user's identity is identified, an identifier of the replying user can be added to the post. The gateway 109 or the member's UE 101 can used to initiate the posting. Additionally, the member's UE 101 or the gateway 109 can send the reply as an update to the posting thread to the group.

With the above approach, users of devices can receive and comment on messages from a member of a social networking service without being subscribed to the service. Thus, the micro-blogging on a social networking service can be expanded to users of UEs 101 via messaging. Additionally, the approach allows for users with devices with only text messaging capabilities to read and comment upon messages.

FIGS. 5A-5E are diagrams of user interfaces utilized in the processes of FIGS. 3 and 4, according to various embodiments. User interface 500 displays a social networking service representation 501 of, for example, a user named Leslie. Leslie is able to add and select people to be on a buddy list 503. The people on the buddy lists may or may not be associated with the social networking service. In one embodiment, phone numbers 505 are used to identify a group of people that Leslie wants to send updated status messages to. User interface 520 displays one such status message 521 that can be posted to a social networking service. Other people that are members of or have access to the social networking service can view Leslie's page 523. The status message can also be sent to the buddy list via a text messaging service. In one embodiment, Joey's user equipment interface 540 receives a text message indicating that Leslie is hungry 541. Joey decides to reply 543 to the message by sending a response to the phone number associated with the message. Joey replies with "Want to get Pizza?" 545. By the processes described above, the posting is updated and the reply is sent to all of the people on the buddy list 503 and/or the social networking service. User interface 560 displays an interface associated with Katie. In one embodiment, Katie is running an application that receives updates to a friend's micro-blog via text messaging ports. Katie reply to the micro-blog messages by hitting a reply feature 561. User interface 580 displays a social networking service user's interface displaying the status message update 581 and comments 583 of Joey and Katie utilizing the processes described above.

The processes described herein for providing augmented social networking messaging may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
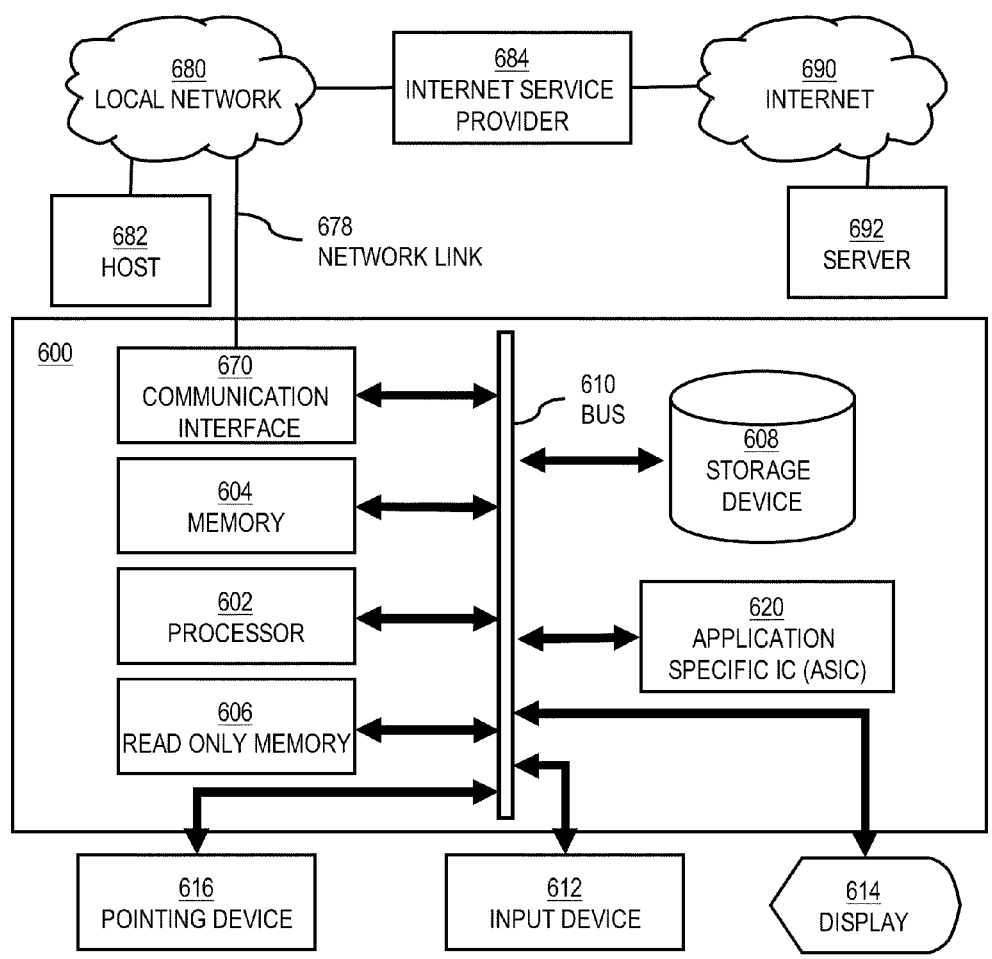
FIG. 6 is a diagram of hardware that can be used to implement an embodiment of the invention.

FIG. 6 illustrates a computer system 600 upon which an embodiment of the invention may be implemented. Computer system 600 is programmed (e.g., via computer program code or instructions) to provide augmented social networking messaging as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to augmented social networking messaging. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing augmented social networking messaging. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing augmented social networking messaging, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server host 692 connected to the Internet hosts a process that provides a service in response to information received over the Internet. For example, server host 692 hosts a process that provides information representing video data for presentation at display 614.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
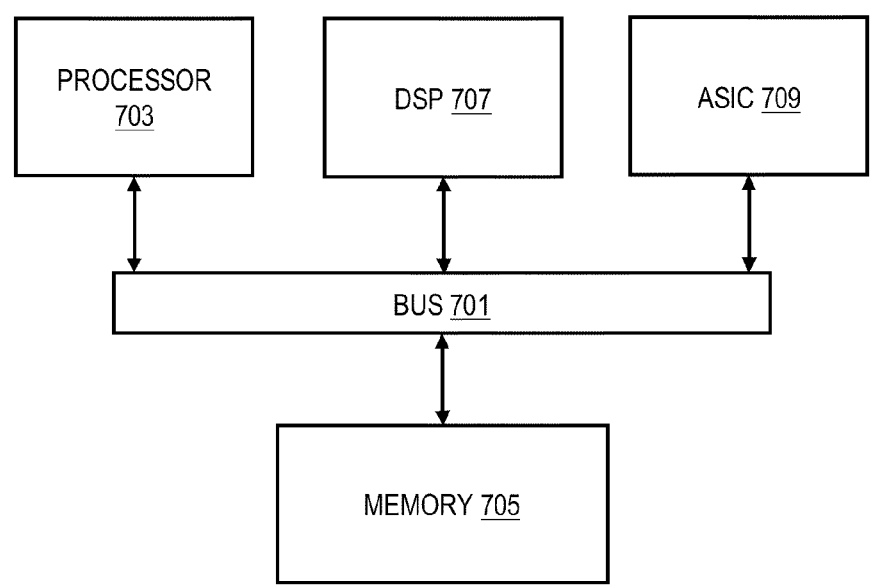
FIG. 7 is a diagram of a chip set that can be used to implement an embodiment of the invention.

FIG. 7 illustrates a chip set 700 upon which an embodiment of the invention may be implemented. Chip set 700 is programmed to provide augmented social networking messaging as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide augmented social networking messaging. The memory 705 also stores the data associated with or generated by the execution of the inventive steps.

Figure 8:
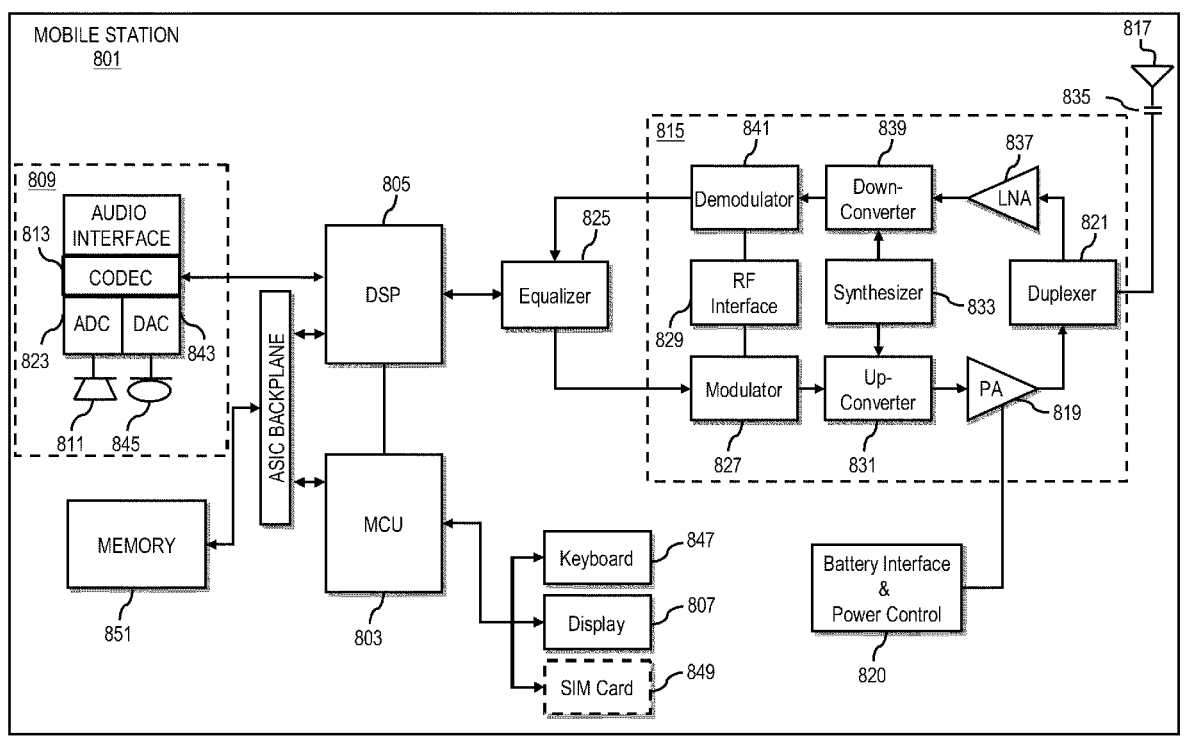
FIG. 8 is a diagram of a mobile station (e.g., handset) that can be used to implement an embodiment of the invention.

FIG. 8 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LIE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide augmented social networking messaging. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   generating a message, which is initiated by a one user associated with a one device, for posting to a social networking service;
   determining addressing information for a group of one or more devices associated with one or more respective device users, wherein the one or more respective device users are associated with the one user, and at least one of the one or more respective device users is a non-subscriber with respect to the social networking service, and wherein the addressing information is used to send the message to the group;
   receiving a reply to the message from a first one of the devices of the group; and
   initiating posting of the reply to the social networking service.

2. A method of claim 1, further comprising:
   determining that the reply is received within a threshold period to trigger the posting.

3. A method of claim 1, further comprising:
   associating the message with a port that is configured to send and receive messages to the group of one or more devices; and
   monitoring incoming data associated with the port for the reply.

4. A method of claim 1, further comprising:
   associating the sent message with a channel that is configured to send and receive messages to the group of one or more devices.

5. A method of claim 1, further comprising:
   retrieving an identifying information associated with the first one of the devices of the group from the reply;
   comparing the identifying information with the addressing information;
   associating the identifying information with a first one of the one or more respective device users; and
   associating the first one of the one or more respective device users with the posting of the reply.

6. A method of claim 1, further comprising:
   receiving a second reply to the message from a second one of the devices of the group;
   retrieving a second identifying information associated with the second one of the devices from the reply;
   comparing the second identifying information with the addressing information;
   associating the second identifying information with a second one of the one or more respective device users; and
   associating the second one of the one or more respective device users with the posting of the second reply.

7. A method of claim 1, further comprising:
   receiving data from one of the devices, wherein the message is generated using the data.

8. A method of claim 1, further comprising:
   receiving a second reply to the message from a second one of the devices of the group;

determining that the second reply is associated with a one of the respective device users that is a non-subscriber with respect to the social networking service; and determining a set of restrictions associated with the second reply.

9. An apparatus comprising:

at least one processor; and at least one memory including computer program code, the at least one memory and the computer program code configured to, with the at least one processor, cause the apparatus to perform at least the following, generate a message, which is initiated by a one user associated with a one device, for posting to a social networking service;

determine addressing information for a group of one or more devices associated with one or more respective device users, wherein the one or more respective device users are associated with the one user, and at least one of the one or more respective device users is a non-subscriber with respect to the social networking service, and wherein the addressing information is used to send the message to the group;

receive a reply to the message from a first one of the devices of the group; and initiate posting of the reply to the social networking service.

10. An apparatus of claim 9, wherein the apparatus is further caused to:

determine that the reply is received within a threshold period to trigger the posting.

11. An apparatus of claim 9, wherein the apparatus is further caused to:

associate the message with a port that is configured to send and receive messages to the group of one or more devices; and monitor incoming data associated with the port for the reply.

12. An apparatus of claim 9, wherein the apparatus is further caused to:

associate the sent message with a channel that is configured to send and receive messages to the group of one or more devices.

13. An apparatus of claim 9, wherein the apparatus is further caused to:

retrieve an identifying information associated with the first one of the devices of the group from the reply;

compare the identifying information with the addressing information;

associate the identifying information with a first one of the one or more respective device users; and associate the first one of the one or more respective device users with the posting of the reply.

14. An apparatus of claim 9, wherein the apparatus is further caused to:

receive a second reply to the message from a second one of the devices of the group;

retrieve a second identifying information associated with the second one of the devices from the reply;

compare the second identifying information with the addressing information;

associate the second identifying information with a second one of the one or more respective device users; and associate the second one of the one or more respective device users with the posting of the second reply.

15. An apparatus of claim 9, wherein the apparatus is a gateway.

16. An apparatus of claim 9, wherein the apparatus is further caused to:

receive second reply to the message from a second one of the devices of the group;

determine that the second reply is associated with a one of the respective device users that is a non-subscriber with respect to the social networking service; and determine a set of restrictions associated with the second reply.

17. A non-transitory computer-readable storage medium carrying one or more sequences of one or more instructions which, when executed by one or more processors, cause an apparatus to perform at least the following:

generate a message, which is initiated by a one user associated with a one device, for posting to a social networking service;

determine addressing information for a group of one or more devices associated with one or more respective device users, wherein the one or more respective device users are associated with the one user, and at least one of the one or more respective device users is a non-subscriber with respect to the social networking service, and wherein the addressing information is used to send the message to the group;

receive a reply to the message from a first one of the devices of the group; and initiate posting of the reply to the social networking service.

18. A non-transitory computer-readable storage medium of claim 17, wherein the apparatus is further caused to:

determine that the reply is received within a threshold period to trigger the posting.

19. A non-transitory computer-readable storage medium of claim 17, wherein the apparatus is further caused to:

associate the message with a port that is configured to send and receive messages to the group of one or more devices; and monitor incoming data associated with the port for the reply.

20. A non-transitory computer-readable storage medium of claim 17, wherein the apparatus is further caused to:

associate the sent message with a channel that is configured to send and receive messages to the group of one or more devices.

* * * * *